(12) United States Patent
Sato (10) Patent No.: US 10,203,915 B2
(45) Date of Patent: Feb. 12, 2019

(54) INFORMATION PROCESSING APPARATUS AND CONTROL METHOD OF INFORMATION PROCESSING APPARATUS (71) Applicant: CANON KABUSHIKI KAISHA, Tokyo (JP)

(72) Inventor: Haruki Sato, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/435,571

(22) Filed: Feb. 17, 2017

(65) Prior Publication Data

US 2017/0249112 A1 Aug. 31, 2017

(30) Foreign Application Priority Data

Feb. 26, 2016 (JP) ................... 2016-036087

(51) Int. Cl.
G06F 1/32 (2006.01)
G06F 3/12 (2006.01)
H04N 1/00 (2006.01)

(52) U.S. Cl.
CPC ............ G06F 3/1221 (2013.01); G06F 1/32 (2013.01); G06F 3/1229 (2013.01); G06F 3/1236 (2013.01); G06F 3/1285 (2013.01); H04N 1/00888 (2013.01); Y02D 10/1592 (2018.01)

(58) Field of Classification Search
USPC ....................................... 358/3.13
See application file for complete search history.

(56) References Cited

U.S. PATENT DOCUMENTS

| 6,823,092 | B1 | 11/2004 | Sato | |
|---|---|---|---|---|
| 7,190,482 | B2 | 3/2007 | Sato | |
| 9,778,887 | B2* | 10/2017 | Kasai | G06F 3/1236 |
| 9,813,507 | B2* | 11/2017 | Liao | H04L 67/142 |
| 2014/0380077 | A1 | 12/2014 | Hara | |
| 2015/0338906 | A1 | 11/2015 | Sato et al. | |
| 2016/0103641 | A1* | 4/2016 | Kasai | G06F 3/1236 358/1.15 |

FOREIGN PATENT DOCUMENTS

JP 2015005236 A 1/2015

* cited by examiner

Primary Examiner — Neil R McLean
Assistant Examiner — Darryl V Dottin
(74) Attorney, Agent, or Firm — Venable LLP (57) ABSTRACT An information processing apparatus according to the present invention is operated by at least switching between a first power state and a second power state in which its power consumption is less than that of the first power state. In a case where an event detected during a period from start to end of processing of making transition from the first power state to the second power state is a communication establishment event, the information processing apparatus causes a communication unit to transmit to a communication partner a notification for maintaining connection of communication in the second power state.

15 Claims, 10 Drawing Sheets

INFORMATION PROCESSING APPARATUS AND CONTROL METHOD OF INFORMATION PROCESSING APPARATUS

BACKGROUND OF THE INVENTION

Field of the Invention

The present invention relates to an information processing apparatus which is operated by switching between a first power state and a second power state in which its power consumption is less than that of the first power state, and a control method of the information processing apparatus.

Description of the Related Art

The recent information processing apparatuses such as image forming apparatuses have the function of bringing operation of a program and the like during execution to the state of a halt so as to reduce power consumption during a non-use period and to resume operation in a state identical to the current operation state. Such a halt of operation is called a suspend mode.

In processing of transiting to the suspend mode, the state of a device immediately before the halt of operation is stored in a memory by a device driver of a kernel to suspend each of services. In addition, some of the apparatuses have a function called a resume which returns to a state immediately before the halt. As a trigger to start resume processing in the suspend mode, there is a case where a wakeup factor is detected. Wakeup factors may include a user's key operation on an operation panel, a timer interrupt, and network packet reception. Further, in the resume processing which is processing of resuming original operation from the suspend mode, the state of the device is returned to a state of the device which has been stored in the memory beforehand so that the states of almost all the devices return to states immediately before transiting to the suspend mode. Time required for such processing is several seconds to several tens of seconds.

Here, there may be a case where the wakeup factor occurs in the middle of the processing of transiting to the suspend mode. Particularly, in a case where the wakeup factor occurs at timing at which a system cannot cancel the processing of transiting to the suspend mode, the system actually transits to the suspend mode, and as a result, there may be a concern that the resume processing will not take place. Japanese Patent Laid-Open No. 2015-005236 discloses a technique to cope with such a situation. According to the technique disclosed in Japanese Patent Laid-Open No. 2015-005236, if a wakeup factor is generated at timing at which a system cannot cancel processing of transiting to a suspend mode, a wakeup scheduling flag is set. In the case where the wakeup scheduling flag is set, the system immediately performs resume processing after completion of suspension. The wakeup scheduling flag is enabled at the time of triggering, for example, detection of network connection establishment during suspension processing.

SUMMARY OF THE INVENTION

An information processing apparatus according to the present invention is operated by at least switching between a first power state and a second power state whose power consumption is less than the first power state. The information processing apparatus includes a communication unit configured to communicate with an outside even in the second power state, a detection unit configured to detect an occurrence of a first event during a period from start to end of processing of making transition from the first power state to the second power state, and, in a case where the first event detected by the detection unit is a communication establishment event, a control unit configured to cause the communication unit to transmit to a partner of the communication a notification for maintaining connection of the communication in the second power state.

Further features of the present invention will become apparent from the following description of exemplary embodiments (with reference to the attached drawings).

DESCRIPTION OF THE EMBODIMENTS

As a communication system between terminals which are connected to a network, there is a system in which connection is established between a transmitting terminal and a receiving terminal and a response whether the receiving terminal properly received communication data or whether the receiving terminal can receive data in succession is made to the transmitting terminal. As a representative of such a system, there is a system using, for example, a protocol of a Transmission Control Packet (TCP). In network communication using this system, in the case of not receiving a response from the receiving terminal for a certain time period, the transmitting terminal determines that the receiving terminal is not in a communicable state and cancels data transmission (which is called a timeout). A specific time period for the timeout made by the transmitting terminal is in accordance with specification set by the transmitting terminal and is not uniquely specified.

Using the technique disclosed in Japanese Patent Laid-Open No. 2015-005236, the wakeup scheduling flag is to be set as a result of network connection establishment in the middle of transiting to the suspend mode. Thus, the receiving terminal can promptly perform resume processing after the transition to the suspend mode. However, the receiving terminal does not give a response to a communication partner during the transition to the suspend mode, during suspension, and during the resume processing, that is, for a period from the transition to the suspend mode to the completion of the resume processing. Since the period from the transition of the suspend mode to the completion of the resume processing takes several seconds to several tens of seconds, there may be a case where the communication partner has been timed out even if the resume processing is completed and the receiving terminal restarts communication.

Figure 1:
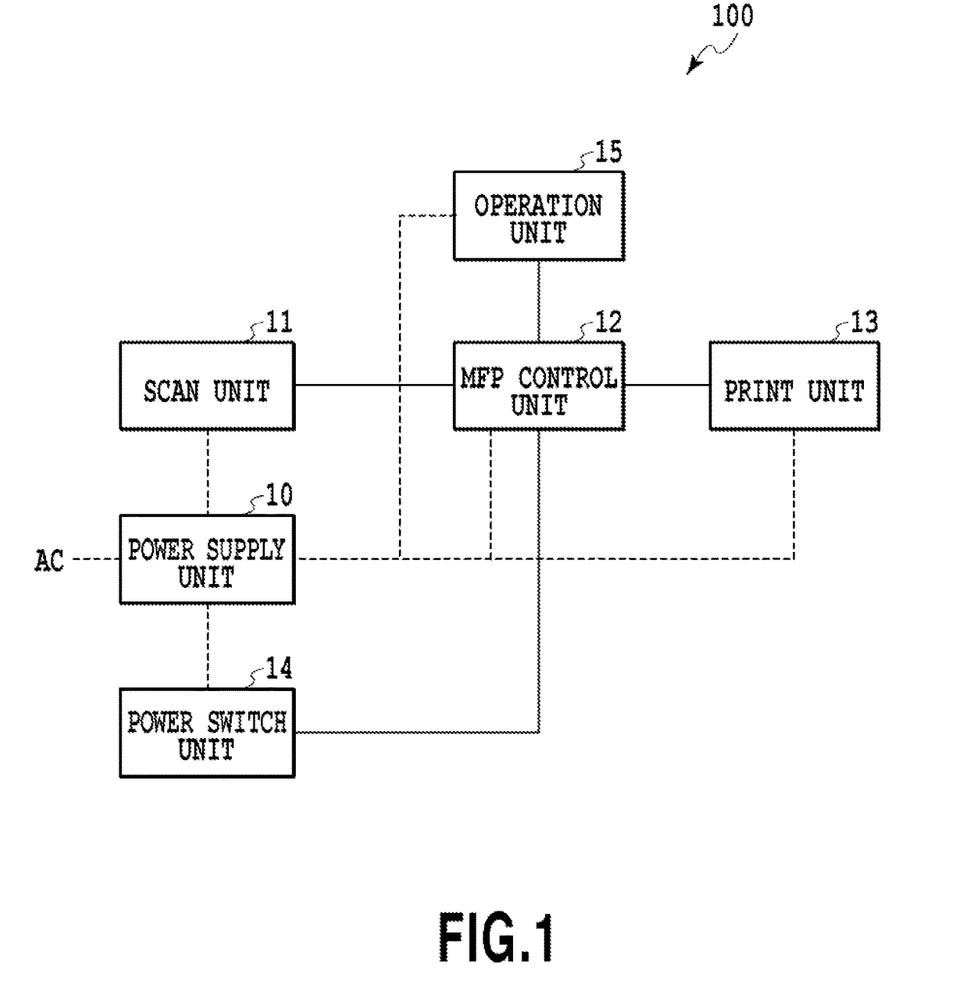
FIG. 1 is a block diagram showing a schematic configuration of an image forming apparatus according to an embodiment of the present invention.

Explanations on an embodiment to carry out the present invention will be given below with reference to the drawings. In the present embodiment, an image forming apparatus will be explained as one example of the information processing apparatus. The image forming apparatus according to the present embodiment is an apparatus which is operated at least to switch between a first power state and a second power state in which its power consumption is less than that of the first power state. FIG. 1 is a block diagram showing a schematic configuration of an image forming apparatus 100 (hereinafter referred to as an "MFP") according to the present embodiment. Solid lines represent control lines and dotted lines represent power supply lines.

The MFP 100 includes multi-functions such as a copying function, printing function, and scanning function. In FIG. 1, an MFP control unit 12 controls the entire MFP. A print unit 13 performs image forming processing in accordance with, for example, an electrophotographic system. A scan unit 11 optically reads an image from a document and converts it into a digital image. Further, a power supply unit 10 supplies power to each unit. An operation unit 15 performs operation of the present apparatus. A power switch unit 14 allows on/off operation of the power supply by a user to control the state of power supply of the MFP 100. It should be noted that a printing system of the print unit 13 is not limited to an electrophotographic system as long as image processing can be made on a sheet-like print medium (e.g., printing paper), and other printing systems such as an inkjet system and a thermal transfer system may also be used.

Figure 2:
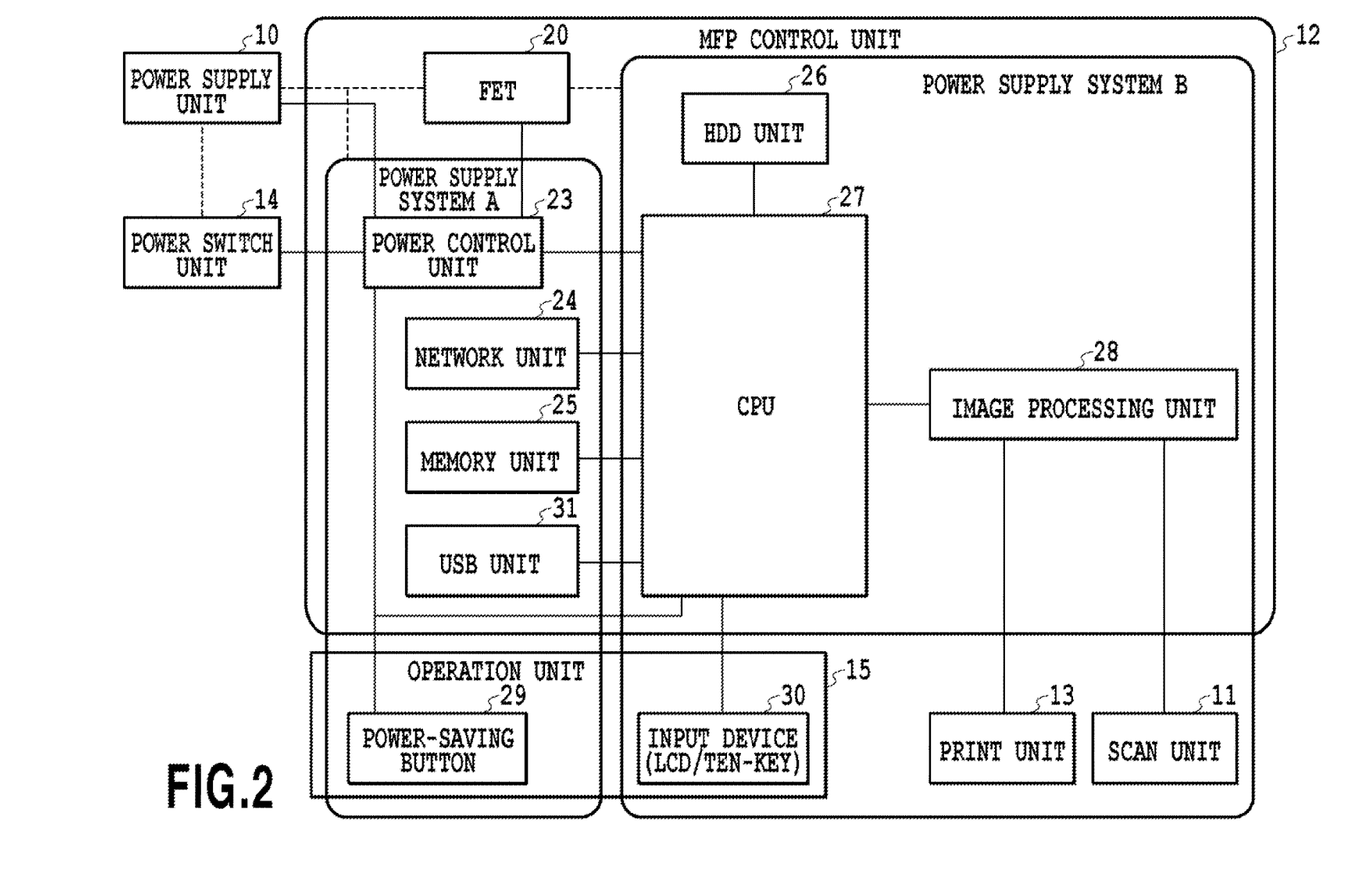
FIG. 2 is a block diagram showing a schematic configuration of an MFP control unit in FIG. 1.

FIG. 2 is a block diagram showing a schematic configuration of the inside of the MFP control unit 12 in FIG. 1 and a relation to each of the units around the MFP control unit 12. Solid lines connecting units represent control lines and dotted lines connecting the units represent power supply lines. It should be noted that constituents identical to those in FIG. 1 are given the same reference numerals and their explanations are omitted.

In FIG. 2, a power control unit 23 includes a function of notifying a CPU 27, as an interrupt, that the power switch unit 14 has been operated and that a power-saving button 29 located on the operation unit 15 has been operated. Further, the power control unit 23 shuts down power supply to each unit at the time of the transition to the suspend mode and controls to supply the power to each unit at the time of resume from the suspend mode. An FET 20 is a switch to turn on/off the power supply to a power supply system B. The power supply system will be described later.

The CPU 27 is a control unit to control the entire MFP 100. A memory unit 25 is a volatile memory such as a DDR-SDRAM. The operation unit 15 has an input device 30 such as an LCD panel and a ten-key inside and detects input operation by a user. An image processing unit 28 is a control unit to perform processing such as compressing data from the scan unit 11 and outputting image data processed by the CPU 27 to the print unit 13. An HDD unit 26 is an external storage, which is, for example, a hard disk (HDD).

A network unit 24 is one of external I/Fs for the MFP, and can receive a request for printing via a network from a non-illustrated external PC or the like. A USB unit 31 is also one of the external I/Fs for the MFP, and can receive a request for printing via the network from the non-illustrated external PC or the like.

Next, the power supply system of the MFP control unit 12 will be explained. According to the present embodiment, the case of applying a suspension system which retains data in a memory in the state where power consumption is less than that in a normal state and activation time is faster is introduced, but other systems such as a hibernation system may be used. The MFP 100 stores, upon detecting the switch-off operation of the power switch unit 14, a state in which the switch-off operation is detected (a first state). Then, the MFP 100 transits, upon detecting the switch-on operation of the power switch, the state of the MFP 100 to a second state, which is resumable to the first state. Therefore, according to the present embodiment, the first state is the normal state and the second state is the suspended state. In addition, the amount of power consumption of the MFP 100 in the suspended state is smaller than the amount of power consumption of the MFP 100 in the normal state.

The power supply system B is a system that supplies power to the CPU 27, the image processing unit 28, the HDD unit 26, and the like. Also, the power supply system B supplies power to the scan unit 11, the print unit 13, the input device 30, and the like which are external devices of the MFP control unit 12. It should be noted that the control of power shutdown/supply in the power supply system B is achieved by controlling the FET 20 by using a control signal outputted from the power control unit 23.

Figure 3:
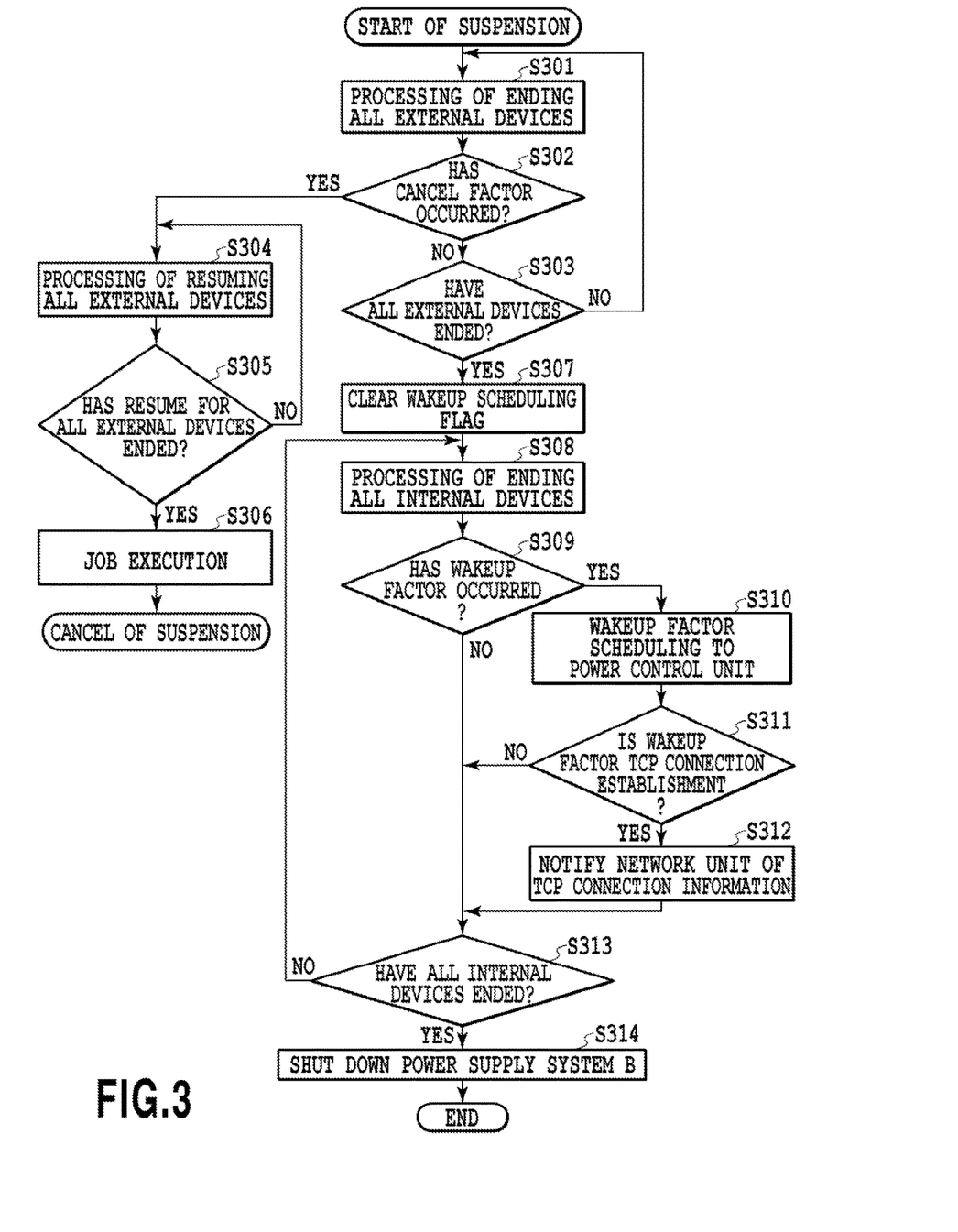
FIG. 3 is a flow chart showing procedures of suspension.
Figure 4:
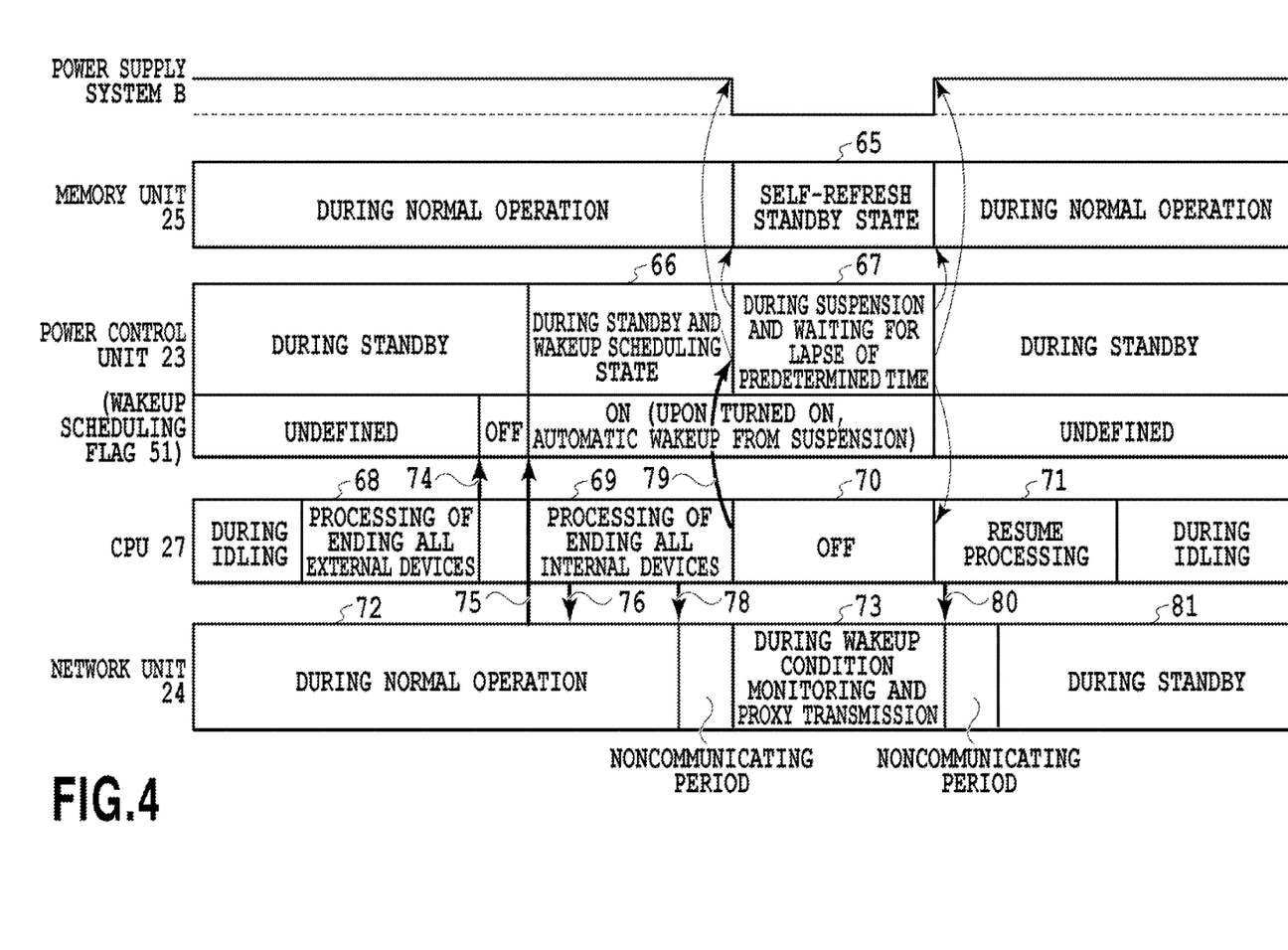
FIG. 4 is a diagram showing the states of devices.

FIG. 3 is a flow chart showing procedures of suspension. Further, FIG. 4 is a diagram showing the state of each of the devices in the present system by a lapse of time. The sequence of the suspension will be explained using the diagram of FIG. 4 and the flow chart of FIG. 3. Each of the steps in the flow chart shown in FIG. 3 is processed by the CPU 27. In the case where no input was made by the input device 30 for a certain time period or upon detecting that the power-saving button 29 has been pressed, the CPU 27 executes the flow of the suspension shown in FIG. 3.

In Step S301, the CPU 27 executes processing of ending external devices of the MFP control unit 12 such as the print unit 13 and the scan unit 11. Since some parts require a certain time for end processing, the CPU 27 confirms, in Step S302, whether a suspension cancel factor occurs, and waits until all of the external devices are determined to end in Step S303. This state corresponds to the processing of ending all external devices in a state 68 shown in FIG. 4. In the case where the suspension cancel factor (e.g., job reception) occurs in the middle of the completion of the end of these external devices, transit-to-suspension processing can be canceled. Meanwhile, as will be described later, in the case where the suspension cancel factor (e.g., job reception) occurs in the middle of the completion of processing of ending the internal devices of the MFP control unit 12, the CPU 27 once completes the transit-to-suspension processing instead of cancelling the transit-to-suspension processing. Then, processing will be performed to resume the normal state from the suspended state. The details of such processing will be described later.

In the case where the cancel factor such as a job from the network unit 24 occurs during processing of ending the external devices, the CPU 27 determines, in Step S302, to cancel the transition to suspension, and proceeds to Step S304. In Step S302, there may be a case where some of the devices have already completed ending them until the point of time when the CPU 27 determines as YES. In this case, the CPU 27 executes, in Step S304, processing of resuming all the external devices, and confirms the completion of the resume in Step S305, and then proceeds to Step S306. In Step S306, the CPU 27 executes the job, for example, which is the cancel factor, and cancels suspension operation. It should be noted that, in the case where the suspension operation is cancelled during the processing of ending the external devices, the CPU 27 executes suspension processing shown in FIG. 3 again after the completion of the job execution, for example, which is the cancel factor.

In the case where no cancel factor occurs in Step S302 and processing of ending all the external devices has been completed in Step S303, the CPU 27 controls not to cancel suspension as described above. In other words, processing of once completing the transit-to-suspension processing will be made. The details will be described below.

In Step S307, the CPU 27 clears a wakeup scheduling flag 51 (event 74) to bring it to a state where the wakeup scheduling flag 51 is turned off. The wakeup scheduling flag 51 is a flag indicating that the wakeup factor occurs at the timing at which the suspension is not cancelled. For example, in a case of receiving a job after Step S307, the wakeup scheduling flag 51 will be set to be ON. In the case where the wakeup scheduling flag is set to be ON, the CPU 27 promptly resumes the normal state after the transition to the suspension. The wakeup scheduling flag 51 is a flag indicating that the wakeup factor has occurred during a period from Step S307 until the complete transition to the suspension, and is retained to be ON during the period from Step S307 until the complete transition to the suspension.

Next, in Step S308, the CPU 27 executes processing of ending all of the internal devices of the MFP control unit 12. The internal devices of the MFP control unit 12 include the network unit 24, the USB unit 31, the HDD unit 26, and the image processing unit 28. After retaining the current state, each of these units executes a mode change so that hardware is independently operated of the control of the CPU 27 even during the suspension. In processing of ending the network unit 24, the CPU 27 executes communication speed change processing (event 78) immediately before ending the network unit 24. Along with the communication speed change processing, a link-down of the network unit 24 is generated and the network unit 24 becomes in an incommunicable state for a period from the completion of the processing until a link-up. Processing associated with the processing of ending the network unit 24 will be explained in detail in FIG. 7 described below. Since the processing of ending these internal devices may take some time, the CPU 27 waits, while determining (detecting) an occurrence of the wakeup factor in succeeding Step S309, until the end of all the internal devices in Step S313 (state 69; processing of ending all the internal devices).

Since the internal devices become inaccessible upon the completion, the internal devices are, unlike the external devices, required to strictly determine an ending order, and interruption in the middle of the end processing, as allowed for the external devices, should be avoided for keeping stable operation. In this regard, according to the present embodiment, as shown in Step S309, an occurrence of the wakeup factor (event 75) is determined in the middle of the processing of ending the internal devices. Further, in the case of detecting that the wakeup factor has been occurred, the CPU 27 sets the wakeup factor to be scheduled in the power control unit 23 in Step S310 (state 66; wakeup scheduled state). Thereafter, the process proceeds to Step S311. In Step S311, in the case where the wakeup factor detected in Step S309 is a TCP connection establishment event in the network unit 24, the process proceeds to Step S312. Otherwise, the process proceeds to Step S313.

In Step S312, the CPU 27 notifies the network unit 24 of information on the TCP connection (hereinafter referred to as connection information) (event 76). Then, the CPU 27 proceeds to Step S313 to continue the suspension processing. Here, the connection information notified to the network unit 24 in Step S312 is retained in a connection information retention unit 52 in the memory unit (see FIG. 5). The connection information retention unit shown in FIG. 5 will be described later. In the case where the wakeup is scheduled in the middle of the processing of ending the internal devices, the state of the flag is retained to be ON in the power control unit 23 as described above (state 66; the wakeup scheduled state).

Upon completion of the processing of ending all of the internal devices in Step S313, the CPU 27 sends, in Step S314, a transit-to-suspension instruction to the power control unit 23 (event 79). Then, the CPU 27 turns off the FET 20 to power off the power supply system B, and the suspended state starts. Specifically, the power control unit 23 causes the memory unit 25 to be in a self-refresh standby state shown in a state 65. In addition, by turning off the power supply system B, the CPU 27 is turned off in a state 70. Thereafter, the power control unit 23 transits to the suspended state as shown in a state 67. The suspended state in the state 67 is a state equivalent to the entire suspended state of the MFP control unit 12. In other words, the MFP control unit 12 is in a state of being transited to the second power state. As such, according to the present embodiment, a suspension system that retains a value in the memory unit 25 per se has been explained, but a hibernation system using the HDD unit 26 and a system of using an MRAM as the memory unit 25 may be able to obtain similar effects.

In the suspended state, only the units included in a power supply system A is in operation. In the suspended state, the network unit 24 monitors whether or not a packet to be received is the one that should resume the normal state from the suspended state. Simultaneously, the network unit 24 executes processing using connection information that has been notified and handed over in Step S312. In other words, the network unit 24 is in a communicable state even in the suspended state. To be more specific, the network unit 24 uses the handed-over connection information to notify a connection partner indicated by the connection information that reception is disabled. By notifying such disabled reception, the network unit 24 can prevent the connection partner from discontinuing communication. As a packet to notify disabled reception, a TCP ZeroWindow packet, for example, is sent. The details will be described later. Further, processing of sending the reception-disabled notification packet in this suspended state by the network unit 24 is called proxy transmission processing. A state 73 indicates a state during wakeup condition monitoring and proxy transmission in the network unit 24. Processing during the wakeup condition monitoring and proxy transmission in the network unit 24 in the state 73 will be described later in FIG. 10.

In the suspended state, the power control unit 23 continues the suspended state while monitoring a resume start. It should be noted that the power control unit may be a CPU built-in unit or a dedicated H/W logic.

Figure 6:
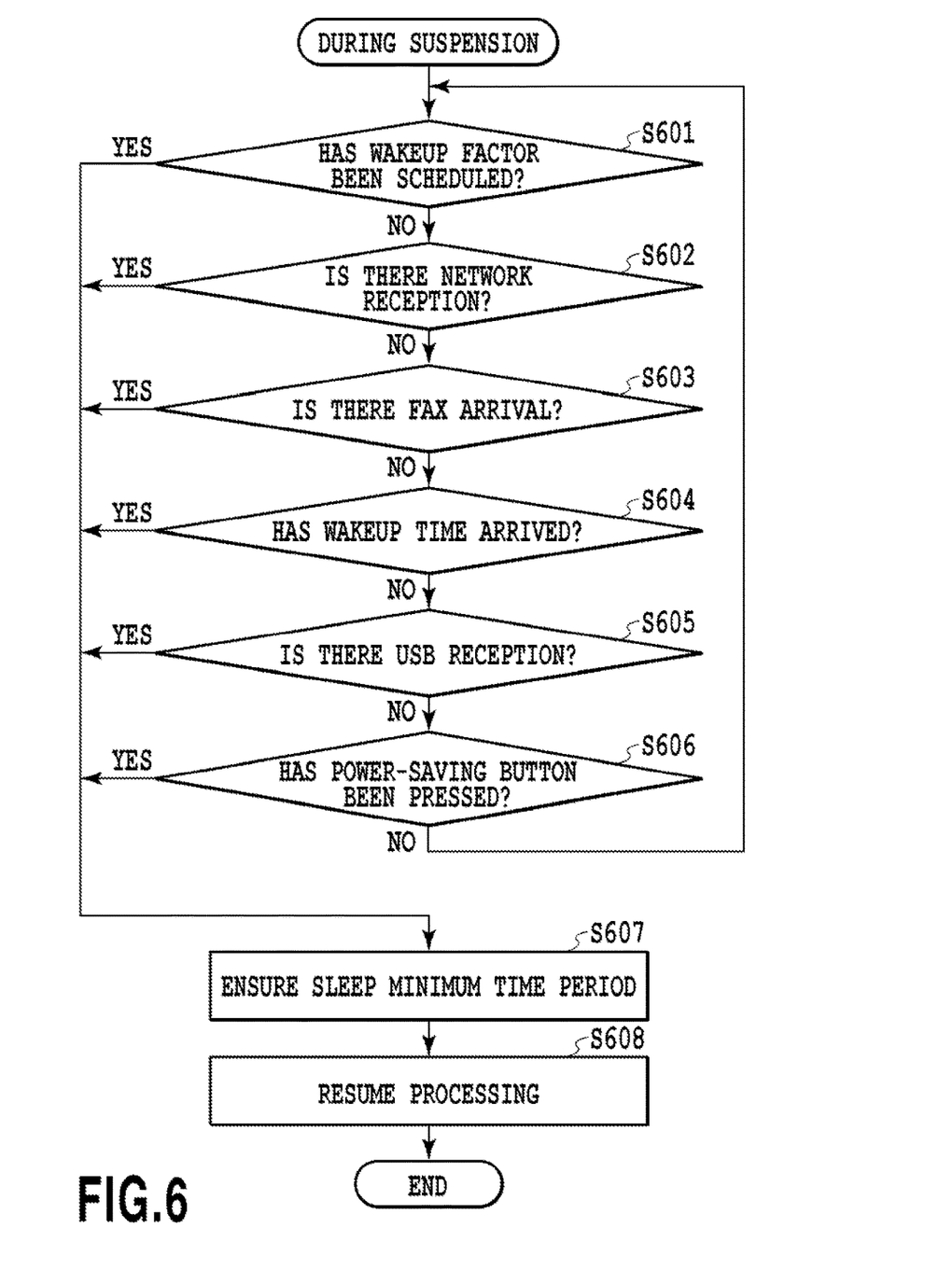
FIG. 6 is a flow chart of the power control unit during suspension.

An operation flow of the power control unit 23 during the suspended state (state 67; during suspension) is shown in FIG. 6. Specifically, FIG. 6 shows processing flow of the power control unit 23 in the suspended state where the power control unit 23 stops power supply to the power supply system B. In the case where the power control unit 23 detects predetermined events shown in Step S601 through Step S606, resume processing of resuming the normal state from the suspended state is to be performed.

In Step S601, the power control unit 23 refers to the wakeup scheduling flag 51 and confirms the presence/absence of wakeup scheduling. As described above, in the case where the wakeup scheduling flag 51 is set to be ON, that is, in the case where the wakeup factor occurs in the middle of the transition to the suspended state, the process proceeds to YES in Step S601. Processing in Step S602 through Step S606 is not in the case where the wakeup factor has occurred in the middle of the transition to the suspended state, but in the case caused by the wakeup factor that has been detected after the transition to the suspended state. In Step S602, the power control unit 23 confirms whether or not an effective resume start instruction such as a job or an inquiry from the network unit 24 has been arrived. In Step S603, the power control unit 23 confirms the presence/absence of a fax arrival from a non-illustrated facsimile apparatus. In Step S604, the power control unit 23 confirms the presence/absence of a specified-time alarm from a non-illustrated RTC. In Step S605, the power control unit 23 confirms the presence/absence of job reception from the USB unit 31. In Step S606, the power control unit 23 confirms whether or not the power-saving button 29 has been pressed. The power control unit 23 waits until any of these events occurs, and if one of the events occurs, the power control unit 23 proceeds to Step S607 to perform minimum suspension time assurance. This is processing to ensure a minimum time period during suspension to avoid reset failure. Thereafter, the power control unit 23 starts the resume processing in Step S608. Specifically, the power control unit 23 turns on the FET 20 to start energizing the power supply system B and to release the reset for the CPU 27. Thereafter, the CPU 27 sets, on each device, the interrupted state of each device which had been retained in the memory unit 25 at the time of the suspension described above so as to transit to a state before making suspension (state 71; resume processing). Also, in the resume processing, the CPU 27 retrieves control authority that had been transferred to the network unit 24 and the USB unit 31 so that the CPU 27 retrieves the whole control authority for the MFP control unit 12. Here, the CPU 27 executes the communication speed change processing of the network unit 24 during processing of retrieving the control authority of the network unit 24 (event 80). Along with this communication speed change processing, a link-down of the network unit 24 is generated and the network unit 24 becomes in an incommunicable state for a period from the completion of the processing until a link-up. The network unit 24 returns to a normal state (state 81; during standby) upon the completion of the communication speed change processing.

Figure 7:
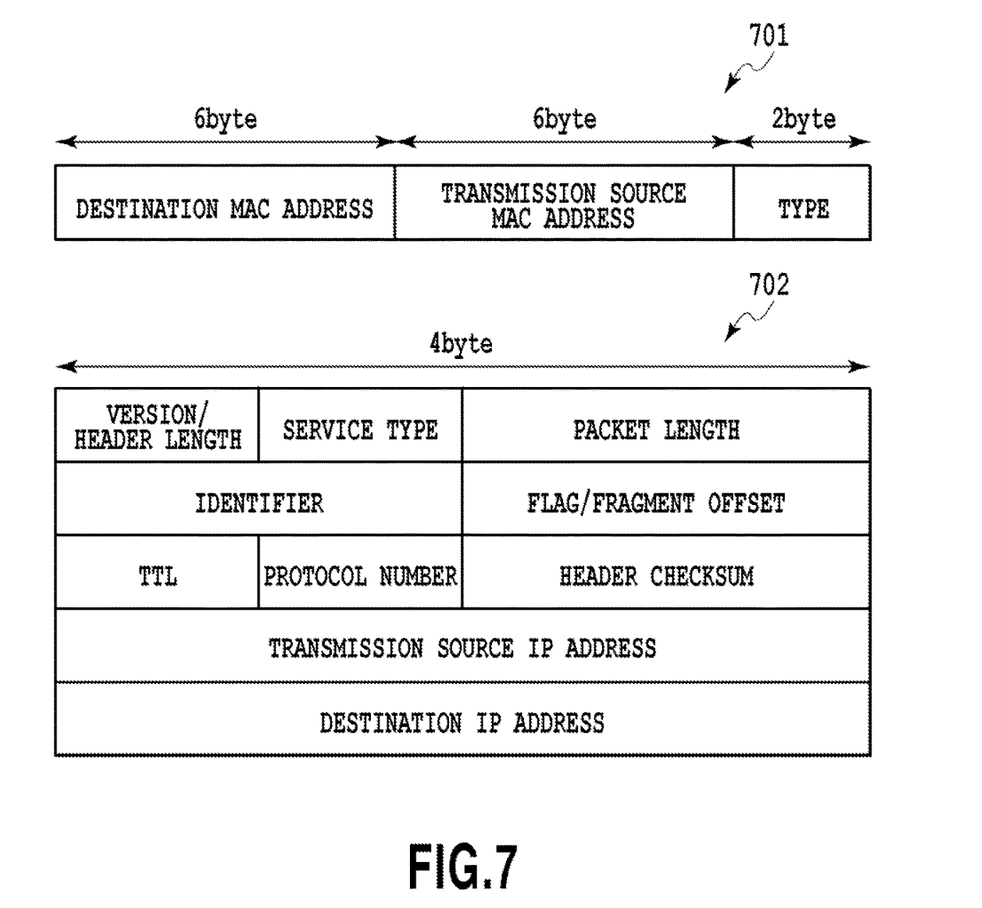
FIG. 7 shows an example of a network packet used in communication according to the present embodiment.

Here, with reference to FIG. 7 and FIG. 8, a TCP packet used in the present embodiment will be explained. FIG. 7 is a diagram showing an example of a format of a packet used in communication according to the present embodiment. The communication packet has an Ether header 701 and then an IP header 702. As a packet that requires connection, there is, for example, a Transmission Control Packet (TCP). The TCP packet has a structure of providing the Ether header 701, the IP header 702, and then a TCP header. It should be noted that, as the TCP packet will be described later with reference to FIG. 8, TCP specification is defined in RFC 793.

Figure 8:
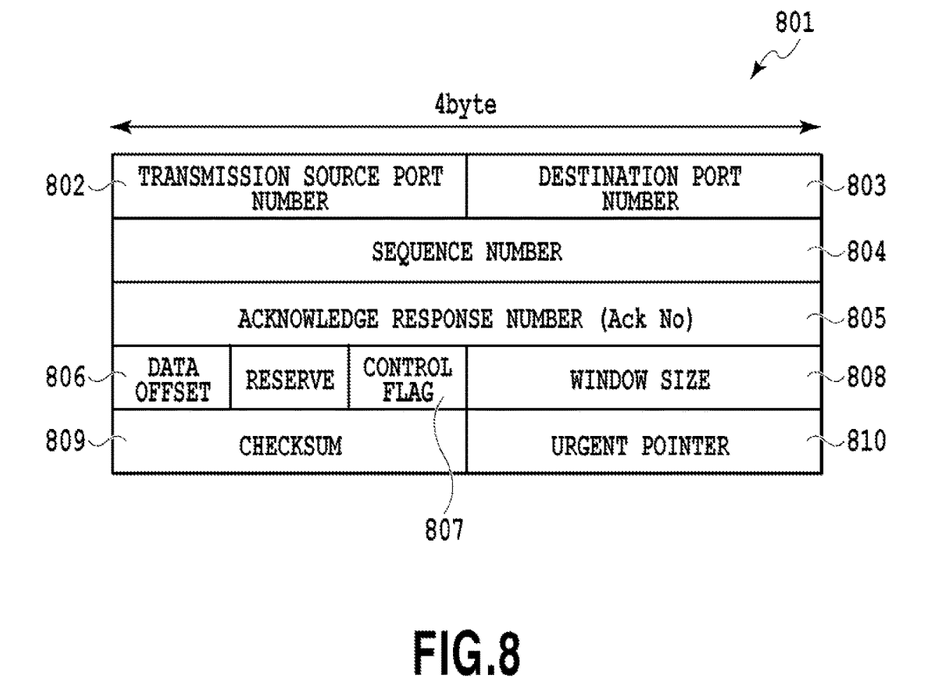
FIG. 8 shows an example of a TCP header of the network packet used in communication according to the present embodiment.

FIG. 8 is a diagram illustrating a format of the TCP packet used in communication that requires connection. In general, the TCP header 801 exists in the communication that requires connection. Management of connection is made by using information contained in the TCP header 801. This management of connection indicates control to ensure the reliability of communication such as order control of communication packets to be transmitted and received via the connection, resend control made at the time of packet loss, packet flow rate control, and congestion avoidance control.

A transmission source port number 802 has 2 bytes and indicates a port number on the side of transmitting a communication packet. A destination port number 803 has 2 bytes and indicates a port number on the side of receiving a communication packet. In the case of communication that requires connection, the transmission source port number 802 and the destination port number 803 take fixed values unless the connection is closed or changed. A sequence number 804 has 4 bytes and indicates the position of data on a transmitted packet, and a value is added by a size of transmitted data for every data transmission. An acknowledge response number (Ack No) 805 has 4 bytes, and indicates a sequence number of data to be subsequently received. Therefore, in the case where the sequence number 804 of a packet to be subsequently transmitted by the transmission side and the acknowledge response number 805 of the received packet are the same, it proves that this communication has been normally made so far. A data offset 806 has 4 bits, and indicates a position at which a data unit field starts in the TCP packet.

A control flag 807 has 6 bits, and indicates control information on the TCP packet. The control flag 807 is set to have one flag type per bit, and the flag types are, namely, URG, ACK, PSH, RST, SYN, and FIN. The URG indicates that urgent data is included. The ACK indicates that a value of the acknowledge response number 805 is effective. The PSH indicates that reception data is to be handed to an upper level application protocol. The RST indicates that connection has been forcibly disconnected for some reason. The SYN indicates a request to establish connection. The FIN indicates a request to discontinue connection which has no data to be transmitted in future. In the case of communication which requires connection, the control flag 807 is controlled for every communication sequence to manage the connection.

A window size 808 has 2 bytes, and indicates a data size receivable subsequent to the position of data indicated by a value of the acknowledge response number 805. The transmitting side cannot make transmission beyond the value of the window size 808. The value of the window size 808 dynamically changes depending on the state of a packet to be processed on the receiving side for every communication sequence, a reception buffer size prepared by the receiving side, setting of a protocol stack on the receiving side, and the like. A packet with the value of the window size 808 being set to zero can also be transmitted in order to notify the transmitting side of the disabled reception.

A checksum 809 has 2 bytes, and offers reliability of a header part and a data part of the TCP packet. The transmitting side calculates the checksum 809 for each packet and adds the result to the packet. The receiving side checks the checksum from the received packet to confirm the absence of breakage on the packet on a communication path. An urgent pointer 810 has 2 bytes, and indicates a storage position pointer of data that requires urgency. An action upon receiving the urgent data is determined by each application on the receiving side.

Next, with reference to FIG. 5, a wakeup factor scheduling and a handover of connection information to the network unit 24 will be explained. Operation for the wakeup factor scheduling and the connection information handover is effective at the timing at which the suspension cannot be cancelled in the middle of the transit-to-suspension processing. In other words, the operation is effective for a period from Step S308 in the flow chart of FIG. 3 to the completion of processing of ending the network unit 24 (a period from the start of the state 69 to the event 75).

Figure 5:
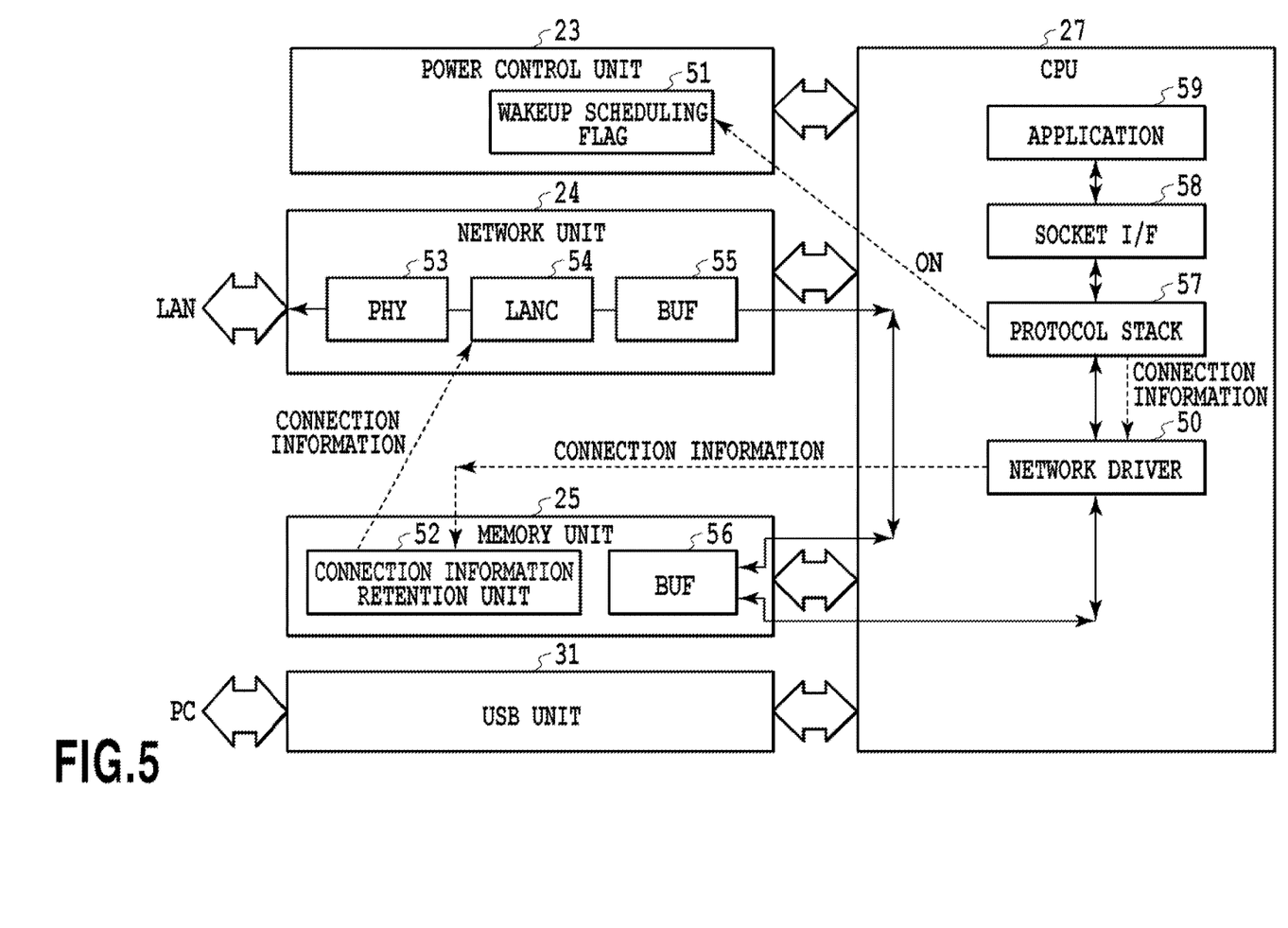
FIG. 5 is a diagram showing the configuration of a wakeup scheduling on a power control unit and a connection information handover to a network unit 24.

FIG. 5 is a diagram illustrating further details of the power control unit 23 and the periphery of the CPU 27. A job, for example, sent from a non-illustrated external host PC is converted between analog and digital in a PHY 53 of the network unit 24, and a LAN controller 54 obtains the resultant as a data packet. This data packet is stored in a buffer 56 which is constituted of a descriptor table, for example, provided in the memory unit 25 via an internal buffer 55. The received data (data packet) is read by a network driver 50 from the buffer 56 and analyzed by a protocol stack 57 for making communication control on each protocol level of networks such as the IP and TCP. The protocol stack 57 and an application 59 exchange data via a socket I/F 58. The application 59 analyzes the content of the data and determines whether or not the packet is a packet such as a job which should be processed. As such, the received data is notified to the application via a buffer on a plurality of hardware and a buffer (substantially, in the memory unit 25) made by using software.

Explanations will be given of an example of a case where the MFP 100 receives a print job by a TCP/IP protocol at the timing after Step S308 in the flow chart of FIG. 3, that is, at the timing at which the suspension cannot be cancelled in the middle of the transition to the suspension. The protocol stack 57 who has received a TCP connection request via the network unit 24 performs processing of establishing TCP connection. It should be noted that an RAW port and an LPD port used for printing have rules such as 9100 and 515, respectively. The protocol stack 57 performs processing on the inside to determine a port number included in the TCP header and to allocate it to any port, and at this moment, it is predictable that the data is probably a print job. The protocol stack 57 issues a command (event 75) from the CPU 27 to set the wakeup scheduling flag 51 in accordance with the port number included in the TCP header. As a result, it is possible to set a wakeup-scheduled state in which required data is received after the resume from the suspension. Upon entering the suspension in this state, the condition of Step S601 in the flow chart of FIG. 6 is achieved, the resume activates, and network communication restarts. However, during a period from the start of communication speed change processing performed at the processing of ending the network unit 24 to the completion of the communication speed change processing performed at the resume processing on the network unit 24, the network unit 24 becomes non-responsive with respect to the host PC who transmits the print job. During this non-responsive period, whether the transmitting side maintains TCP connection without being timed out depends on the specification set by the transmitting side and thus is not ensured.

In this regard, according to the present embodiment, the protocol stack 57 stores, after setting the wakeup scheduling flag 51, the TCP connection information in the connection information retention unit 52 in the memory to hand over the connection information to the network unit 24 (event 76).

The network unit 24 during the wakeup condition monitoring and the proxy transmission (state 73) maintains the connection by using the handed-over connection information to perform proxy transmission processing on the reception-disabled notification (TCP ZeroWindow) packet with respect to the connection. As a result, the possibility of the transmitting side being timed out will be reduced. To be more specific, as shown in FIG. 4, the network unit 24 transits to the state during wakeup condition monitoring and the proxy transmission (state 73) after the end of the noncommunicating period due to the communication speed change processing performed in the processing of ending the network unit 24. In this state 73, the network unit maintains the connection by using the handed-over connection information to perform the proxy transmission processing on the reception-disabled notification (TCP ZeroWindow) packet with respect to the connection. Thereafter, in the case where the CPU 27 refers to the wakeup scheduling flag 51 to start the resume processing, the noncommunicating period is generated again due to the communication speed change processing, and then, the network unit 24 resumes a standby state. Then, the protocol stack 57 uses the handed-over connection information to transmit the packet notifying a request to restart communication (TCP WindowUpdate). Upon its reception, the host PC who is to be transmitting the print job restarts transmission of print data on the print job.

As described above, the explanation was given of the method of avoiding situation where the transmitting side will be timed out and discontinue the connection during the period from entering the suspension in the middle of the processing of an inquiry, a job, or the like from the outside which occurs immediately before entering the suspension until resuming operation and making responses.

Figure 9:
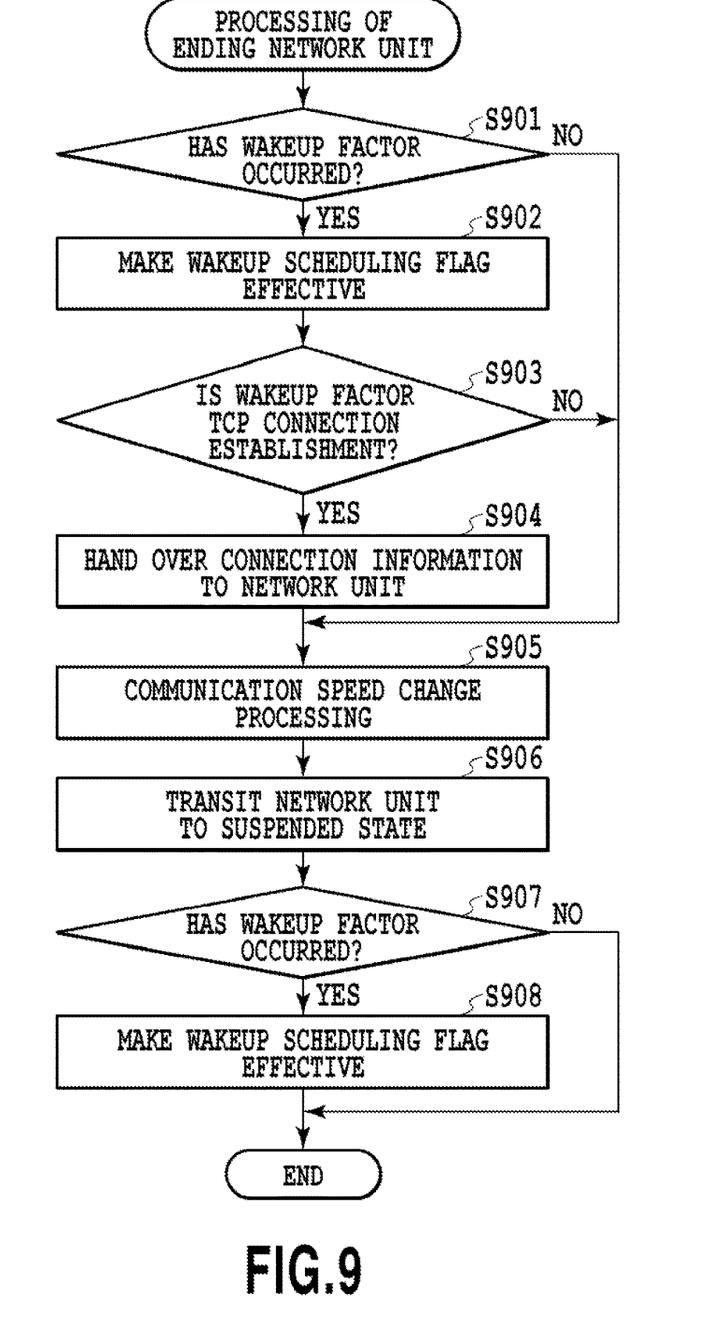
FIG. 9 is a flow chart showing procedures of suspension of a network unit.

FIG. 9 is a flow chart showing processing of ending the network unit 24 in particular out of processing in Step S308 shown in FIG. 3 which is executed by the CPU 27.

In Step S901, the CPU 27 determines whether the occurrence of the wakeup factor has been detected. If the wakeup factor has occurred (Yes in S901), the process proceeds to Step S902 and the CPU 27 executes wakeup scheduling processing. If the wakeup factor does not occur, the process proceeds to Step S905. In Step S902, the CPU 27 executes processing of making the wakeup scheduling flag 51 of the power control unit 23 effective. Then, in Step S903, the CPU 27 determines whether or not the wakeup factor detected in Step S901 is a TCP connection establishment by the protocol stack 57. If the wakeup factor is the TCP connection establishment by the protocol stack 57, the process proceeds to Step S904, and if not, the process proceeds to Step S905. In Step S904, the CPU 27 hands over the TCP connection information to the network unit 24. Specifically, the protocol stack 57 of the CPU 27 hands over the following information to the network unit from the TCP packet having received by that moment.

transmission source MAC address
  destination MAC address
  transmission source IP address
  destination IP address
  transmission source port number
  destination port number
  received data size
  sequence number
  acknowledge response number (Ack No)
  Then, the process proceeds to Step S905.

In Step S905, the CPU 27 executes the communication speed change processing on the network unit 24. In general, it is likely that the lower the setting of communication speed is, the lower the power consumption of the network unit 24 becomes, and thus, the communication speed change processing is intended to suppress the power consumption at the time of the suspension. However, along with the communication speed change processing, the link-down of the network unit 24 is generated, whereby the network unit becomes in an incommunicable state for a period until the setting is completed and the link-up is made.

Upon the completion of the communication speed change processing, the CPU 27 executes, in Step S906, processing of transiting the network unit 24 to the suspend mode. At this time, in the case where connection information is handed over in Step S904, the CPU 27 causes the network unit 24 to perform proxy transmission using the connection information. To be more specific, the CPU 27 switches an operation mode so that the network unit 24 uses the connection information stored in the connection information retention unit to perform proxy transmission of the TCP ZeroWindow packet. In the case where the connection information is not handed over, the network unit 24 is transited to the wakeup condition monitoring state in which the detection of network reception in Step S602 during suspension is executable. As a result, the network unit 24 is, in Step S313, determined to be in the state of the end of the devices. As such, according to the present embodiment, in the case where the wakeup factor is the TCP connection establishment in performing the processing of ending the network unit 24, the CPU 27 executes the communication speed change processing after handing over the connection information to the network unit 24.

Incidentally, there may be a case where the wakeup factor occurs after the completion of the processing in Step S906, that is, after the network unit 24 has been transited to the suspended state. In Step S907, in the case where the wakeup factor has occurred after the network unit 24 is transited to the suspended state, the CPU 27 proceeds to Step S908, making the wakeup scheduling flag effective. At the stage of this Step S908, however, the network unit 24 is in the state of the end of the devices, and therefore, the CPU 27 does not execute processing of handing over the connection information. As a result, in the case where, for example, the wakeup factor has occurred for the first time after Step S903, the network unit 24 is not to be performing proxy transmission of the TCP ZeroWindow in the suspend mode.

Figure 10:
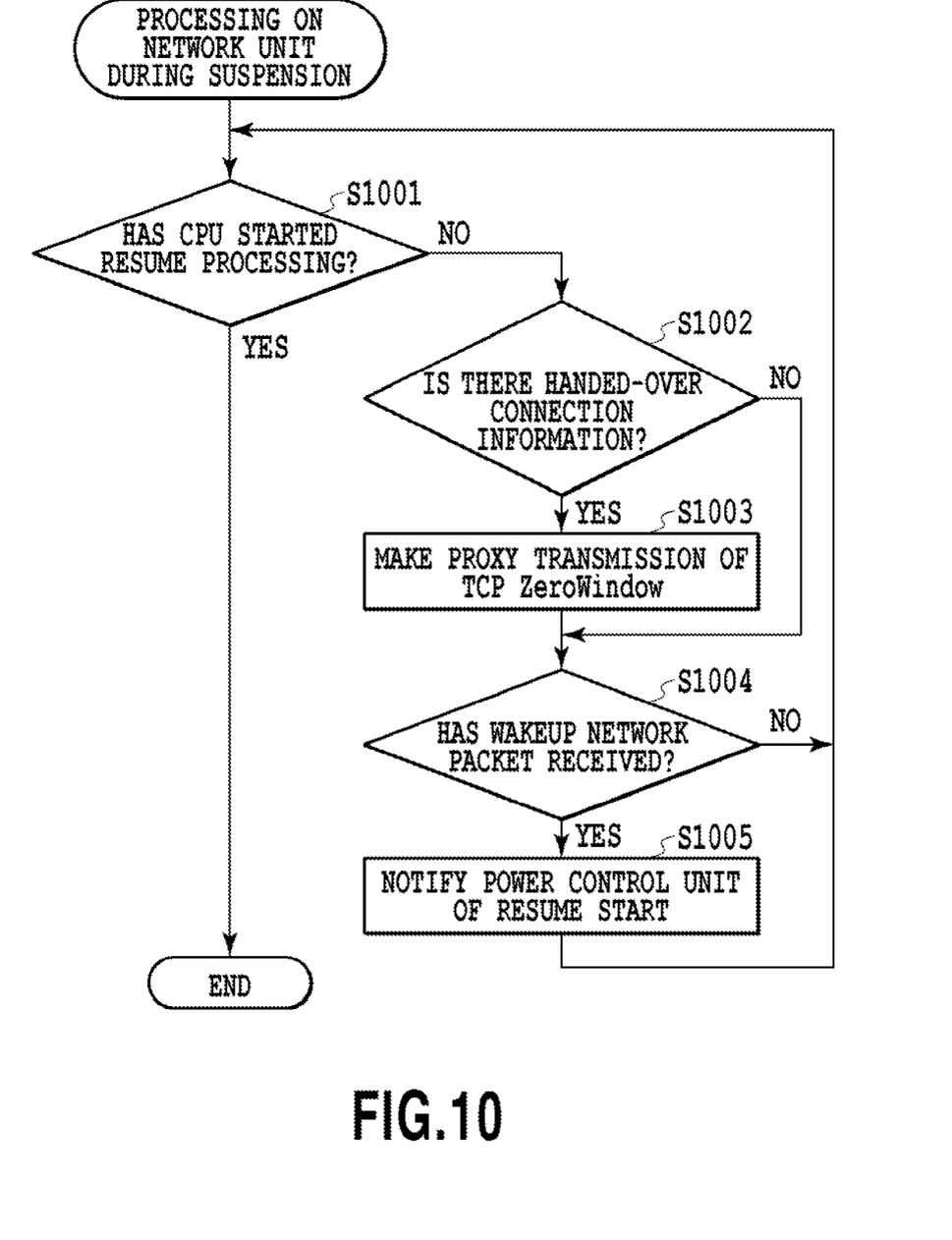
FIG. 10 is a flow chart showing processing of the network unit while an MFP 100 is in suspension.

Next, FIG. 10 is a processing flow of the network unit 24 in the state during wakeup condition monitoring and proxy transmission (state 73) according to the present embodiment. Each of the steps in the flow chart shown in FIG. 10 is processed by the network unit 24. In Step S1001, the network unit 24 waits for the resume processing to be executed by the CPU 27. The resume processing by the CPU 27 corresponds to the event 80 shown in FIG. 4. Factors of the occurrence of the resume processing by the CPU 27 are the ones shown in the flow chart of FIG. 6. As an example, there is a case where the wakeup factor has been scheduled due to the establishment of TCP connection. In Step S1001, in the case where the start of the resume processing has been notified from the CPU 27, the network unit 24 ends the processing in the state during wakeup condition monitoring and proxy transmission (state 73) and the CPU 27 retrieves a control authority of the network unit 24. In the case where the start of the resume processing is not notified, that is, in the case where no resume start instruction is given, the process proceeds to Step S1002.

In Step S1002, in the case where the network unit 24 is determined to be handed over the connection information from the CPU 27, the network unit 24 proceeds to Step S1003 and performs proxy transmission of the TCP ZeroWindow packet using the handed-over connection information. Specifically, in a state during normal operation (state 72), the network unit 24 transmits the following TCP ZeroWindow packet (TCP packet) as an ACK response packet for the packet of the lastly-received TCP connection. Then, the process proceeds to Step S1004. In the case where there is no handed-over connection information in Step S1002, the process proceeds to Step S1004.

an Ether header setting a handed-over transmission source MAC address as a destination MAC address, and a handed-over destination MAC address as a transmission source MAC address;

an IP header setting a handed-over transmission source IP address as a destination IP address, and a handed-over destination IP address as a transmission source IP address; and a TCP header specifying a handed-over transmission source port number as a destination port number, a handed-over destination port number as a transmission source port number, and a handed-over sequence number as an acknowledge response number, and specifying a window size as zero.

Then, in Step S1004, the network unit 24 confirms presence/absence of the reception of a wakeup network packet. In the case of receiving the wakeup network packet, the process proceeds to Step S1005, and the network unit 24 notifies the power control unit 23 of the resume start and then returns to Step S1001. It should be noted that S1005 indicates processing that corresponds to the processing in Step S602 shown in FIG. 6.

OTHER EMBODIMENTS

Incidentally, explanations have been given of the present embodiment exemplifying that the network unit 24 performs proxy transmission of the TCP ZeroWindow to the communication partner of the handed-over TCP connection to maintain the connection, but the connection maintaining method is not limited to this. For example, the connection may be maintained by using the handed-over connection information to perform proxy transmission of a TCP KeepAlive packet. Further, explanations have been given by exemplifying the case of using the TCP as a protocol, but any protocol may be used as long as the form of connection is made by maintaining the connection. In other words, any protocol having specification to discontinue connection in a case where no response is made from the communication partner may be applicable.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a response to communication such as an inquiry and a job from the outside generated in the middle of the transition to the suspend mode can be made. Accordingly, the transmitting side is prevented from being timed out and disconnecting the connection.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-036087, filed Feb. 26, 2016, which is hereby incorporated by reference wherein in its entirety.

What is claimed is:

1. An information processing apparatus which is operated by at least switching between a first power state and a second power state whose power consumption is less than the first power state, the information processing apparatus comprising:
   at least one processor; and
   at least one memory storing instructions,
   wherein the at least one processor executes the instructions to perform the functions of
      a communication unit configured to communicate with an outside even in the second power state;
      a detection unit configured to detect an occurrence of a first event during a period from start to end of processing of making transition from the first power state to the second power state; and
      in a case where the first event detected by the detection unit is a communication establishment event, a control unit configured to cause the communication unit to transmit, in the second power state, to a connection partner of the communication a notification for maintaining connection of the communication.

2. The information processing apparatus according to claim 1, wherein the at least one processor executes the instructions to further perform the functions of:
   in a case where the occurrence of the first event has been detected by the detection unit, a scheduling unit configured to schedule a resume to the first power state; and
   in a case where the scheduling has been made by the scheduling unit, a resume unit configured to resume the first power state from the second power state after completion of the transition to the second power state.

3. The information processing apparatus according to claim 2, wherein
   in a case where the first event detected by the detection unit is the communication establishment event, the control unit causes the communication unit, after the resume to the first power state is made by the resume unit, to transmit to the partner of the communication a notification of requesting a restart of the communication.

4. The information processing apparatus according to claim 2, wherein:
   the detection unit can further detect an occurrence of a second event in the second power state; and
   in a case where no scheduling is made by the scheduling unit and the occurrence of the second event is detected in the second power state, the resume unit resumes the first power state from the second power state.

5. The information processing apparatus according to claim 4, wherein
   in a case where a scheduling is made by the scheduling unit, the resume unit resumes the first power state from the second power state even in a case where the detection unit does not detect the occurrence of the second event in the second power state.

6. The information processing apparatus according to claim 4, wherein
   in a case where the second event detected by the detection unit after the communication unit has been transited to the second power state is the communication establishment event, the control unit does not make control to cause the communication unit to transmit the notification to the partner of the communication.

7. The information processing apparatus according to claim 1, wherein:
   the first event is a TCP connection establishment event; and
   the communication unit transmits a predetermined TCP packet as a notification to maintain connection of the communication.

8. The information processing apparatus according to claim 7, wherein
   the control unit causes the communication unit to make proxy transmission of the predetermined TCP packet using connection information indicating TCP connection lastly made in the first power state.

9. The information processing apparatus according to claim 7, wherein the TCP packet is a TCP ZeroWindow packet.

10. The information processing apparatus according to claim 7, wherein the TCP packet is a TCP KeepAlive packet.

11. The information processing apparatus according to claim 1, wherein
   the period from start to end of processing of making transition from the first power state to the second power state is a period in which the processing of making transition from the first power state to the second power state cannot be cancelled.

12. The information processing apparatus according to claim 11, wherein
   the period in which the processing cannot be cancelled is a period after the start of processing of transiting to a mode in which hardware independently operates even in the second power state.

13. The information processing apparatus according to claim 1, wherein the communication unit changes a communication speed at the time of switching between the first power state and the second power state.

14. A control method of an information processing apparatus including at least one processor and at least one memory, which is operated by at least switching between a first power state and a second power state whose power consumption is less than the first power state and which includes a communication unit that can communicate with an outside even in the second power state, the control method comprising the steps of:
   detecting, using the at least one processor, an occurrence of a first event during a period from start to end of processing of making transition from the first power state to the second power state; and
   in a case where the first event detected in the detecting step is a communication establishment event, controlling, using the at least one processor, to cause the communication unit to transmit, in the second power state, to a connection partner of the communication a notification for maintaining connection of the communication.

15. A non-transitory computer readable storage medium storing a program for causing a computer to perform a control method of an information processing apparatus which is operated by at least switching between a first power state and a second power state whose power consumption is less than the first power state and which includes a communication unit that can communicate with an outside even in the second power state, where the method comprises the steps of:

detecting, using the computer, an occurrence of a first event during a period from start to end of processing of making transition from the first power state to the second power state; and in a case where the first event detected in the detecting step is a communication establishment event, controlling, using the computer, to cause the communication unit to transmit, in the second power state, to a connection partner of the communication a notification for maintaining connection of the communication.

* * * * *